(12) United States Patent
Brunner et al.

(10) Patent No.: US 8,052,199 B2
(45) Date of Patent: Nov. 8, 2011

(54) DEVICE FOR ABSORBING SIDE FORCES

(75) Inventors: Markus Brunner, Bietigheim-Bissingen (DE); Andrea Lippold, Stuttgart (DE); Stephan Brausse, Eningen (DE); Robert Kohr, Neustadt (DE); Peter Baumann, Kieselbronn (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 19 days.

(21) Appl. No.: 12/706,523

(22) Filed: Feb. 16, 2010

(65) Prior Publication Data

US 2010/0225145 A1    Sep. 9, 2010

Related U.S. Application Data

(60) Provisional application No. 61/172,920, filed on Apr. 27, 2009.

(30) Foreign Application Priority Data

Mar. 6, 2009   (DE) .......................... 10 2009 012 057

(51) Int. Cl.
   *B62D 25/00*   (2006.01)
(52) U.S. Cl. .............................. 296/187.12; 296/193.02
(58) Field of Classification Search .................... 296/30, 296/187.01, 187.03, 187.12, 190.03, 193.02, 296/193.07, 203.01, 203.03, 204, 209
   See application file for complete search history.

(56) References Cited

U.S. PATENT DOCUMENTS

| | | | |
|---|---|---|---|
| 5,641,194 A | 6/1997 | Honma et al. | |
| 6,027,159 A | 2/2000 | Baumann | |
| 6,189,952 B1 | 2/2001 | Schmidt et al. | |
| 6,688,677 B2 | 2/2004 | Glashagel et al. | |
| 7,413,242 B2* | 8/2008 | Rashidy et al. | 296/193.02 |
| 7,581,781 B2 | 9/2009 | Brunner et al. | |
| 7,854,474 B2* | 12/2010 | Cox | 296/204 |

FOREIGN PATENT DOCUMENTS

| | | |
|---|---|---|
| DE | 195 32 004 | 3/1996 |
| DE | 297 14 656 | 2/1999 |
| DE | 101 17 010 | 10/2002 |
| DE | 10 2005 051 947 | 5/2007 |

* cited by examiner

*Primary Examiner* — Dennis Pedder
*Assistant Examiner* — Jason Daniels
(74) *Attorney, Agent, or Firm* — Gerald E. Hespos; Michael J. Porco

(57) ABSTRACT

A device for absorbing side forces during a side impact of a motor vehicle has a reinforcing structure (12) with a transversely extending reinforcing beam (14). An end (15) of the reinforcing beam (14) is mounted in a bracket (20) that is fixed to the vehicle. A profile part (30) is at the end (15) of the reinforcing beam (14) and supports the reinforcing beam (14). The profile part (30) is connected firmly to the bracket (20) that is fixed to the vehicle thereby providing improved side impact protection and enhanced safety for vehicle occupants.

17 Claims, 3 Drawing Sheets

DEVICE FOR ABSORBING SIDE FORCES

CROSS-REFERENCE TO RELATED APPLICATIONS

This application claims priority under 35 USC 119 to German Patent Application No. 10 2009 012 057.2 filed on Mar. 6, 2009 and U.S. Provisional Patent Appl. No. 61/172,920 filed on Apr. 27, 2009, the entire disclosures of which are incorporated herein by reference.

BACKGROUND OF THE INVENTION

1. Field of the Invention

The invention relates to a device for absorbing side forces during a side impact of a motor vehicle, with a reinforcing structure that is effective in the transverse direction and comprises a transversely extending reinforcing beam with an end arranged in a bracket fixed to the vehicle, and with a profile part at one end of the reinforcing beam.

2. Description of the Related Art

German Patent DE 10 2005 051 947 B4 discloses a device for absorbing side forces during a side impact of a motor vehicle with a profile part inserted through and held in a bracket fixed to the vehicle. A free region of the profile part projects from the bracket and is provided in a pillar space together with a beam element. An end region of the profile part is provided with an impact plate that is connected to upright legs of the profile part.

It is an object of the invention to improve safety of vehicle occupants and to improve side impact protection.

SUMMARY OF THE INVENTION

The invention relates to a device for absorbing side forces during a side impact of a motor vehicle. The device includes a reinforcing structure that is effective in the transverse direction. The device comprises a transversely extending reinforcing beam with an end that is arranged in a bracket fixed to the vehicle. A profile part is at the end of the reinforcing beam. More particularly, the profile part for supporting the reinforcing beam is connected firmly to the bracket fixed to the vehicle. Thus, the forces that occur during a side impact are introduced more effectively into the vehicle superstructure. Forces that occur during a side impact can be introduced laterally in a controlled manner into the reinforcing beam both by a B pillar and by a region of a longitudinal beam in which the B pillar is rooted.

The profile part preferably has a dished profile with a base plate that is connected firmly on two longitudinal sides to the bracket fixed to the vehicle. The peripheral edges preferably are angled at the longitudinal sides of the base plate so that they rest against the bracket fixed to the vehicle. A material connection between the profile part and the bracket fixed to the vehicle thereby can be made in a simple way, by welding for example, or with positive engagement by means of bolts. The base plate of the profile part extends substantially transversely with respect to the reinforcing beam.

The profile part may have an X-shaped reinforcing structure with four legs. The reinforcing structure can be produced by forming the base plate of the dished profile. The four legs preferably extend transversely away from the reinforcing beam and improve the introduction of force into the reinforcing beam.

Two legs of the X-shaped reinforcing structure of the profile part may be connected by a connecting web that faces the reinforcing beam. The reinforcing beam extends between the two connecting webs. A reinforcing sleeve can be arranged between the reinforcing beam and the connecting webs of the profile part. The connecting webs can be connected directly, by a material connection, for example, to the reinforcing beam or to the reinforcing sleeve.

The profile part may rest against a reinforcing sleeve through which the reinforcing beam extends. The connecting webs can be connected to the reinforcing sleeve, such as by an integral connection. The reinforcing sleeve preferably extends over only an end portion at the end of the reinforcing beam to improve the introduction of force into the reinforcing beam.

The four legs of the X-shaped reinforcing structure of the profile part may be connected together integrally by the base plate. The X-shaped reinforcing structure preferably extends from the base plate of the profile part into the vehicle interior, i.e. away from the B pillar.

The bracket that is fixed to the vehicle preferably comprises a bottom plate with a through hole through which the reinforcing beam extends. The bracket preferably is spaced from a base plate of the profile part. The bottom plate of the bracket extends substantially transversely with respect to the reinforcing beam. As a result, the bottom plate of the bracket preferably is approximately parallel to the base plate of the profile part. The reinforcing beam preferably extends together with the reinforcing sleeve through the through hole in the bottom plate of the bracket that is fixed to the vehicle and further through a hole, arranged in alignment thereto, in the base plate of the profile part.

Two wings preferably project at an angle from the sides of the bottom plate and the base plate of the profile part preferably is fixed to wings. The wings preferably extend from the bottom plate of the bracket that is fixed to the vehicle and project toward a B pillar and a longitudinal beam in which the B pillar is rooted. A cavity may be defined between the wings and the profile part may be arranged in the cavity. The base plate of the profile part may be affixed to the wings, for example, by a material connection, welding or adhesive bonding.

Two fixing flanges preferably project at an angle from each of the wings. One fixing flange is fixed to a B pillar and the other is fixed to a sill of the motor vehicle. The fixing flanges preferably project from the wings at an angle so that they rest respectively against the B pillar and the sill. The sill is a longitudinal beam and may be the above-described longitudinal beam. The fixing of the fixing flanges to the B pillar and the longitudinal beam and the sill may be accomplished by a material connection, such as welding and/or by riveted or bolted connection elements.

The reinforcing beam may be supported on the inside of the sill by a second bracket. The second bracket can further control the introduction of force into the reinforcing beam during a side impact.

The second bracket may be integral with a floor reinforcement that extends underneath the reinforcing beam. The floor reinforcement can be embodied as a casting that extends parallel to the reinforcing beam. The floor reinforcement can be connected to a center tunnel.

The cross section of the reinforcing beam may define a rectangle or a rectangle with rounded corners.

The reinforcing beam may be continuous and preferably extends at a distance from a floor assembly of the motor vehicle or from the above-described floor reinforcement. The reinforcing beam is preferably crank-shaped in the region of a center tunnel.

The invention also relates to a motor vehicle with at least one of the above-described devices. The motor vehicle preferably has two of the above-described devices mounted respectively at the ends of the reinforcing beam.

Further advantages, features and details of the invention will emerge from the following description, in which an illustrative embodiment is described in detail with reference to the drawings.

DETAILED DESCRIPTION OF THE PREFERRED EMBODIMENT

Figure 1:
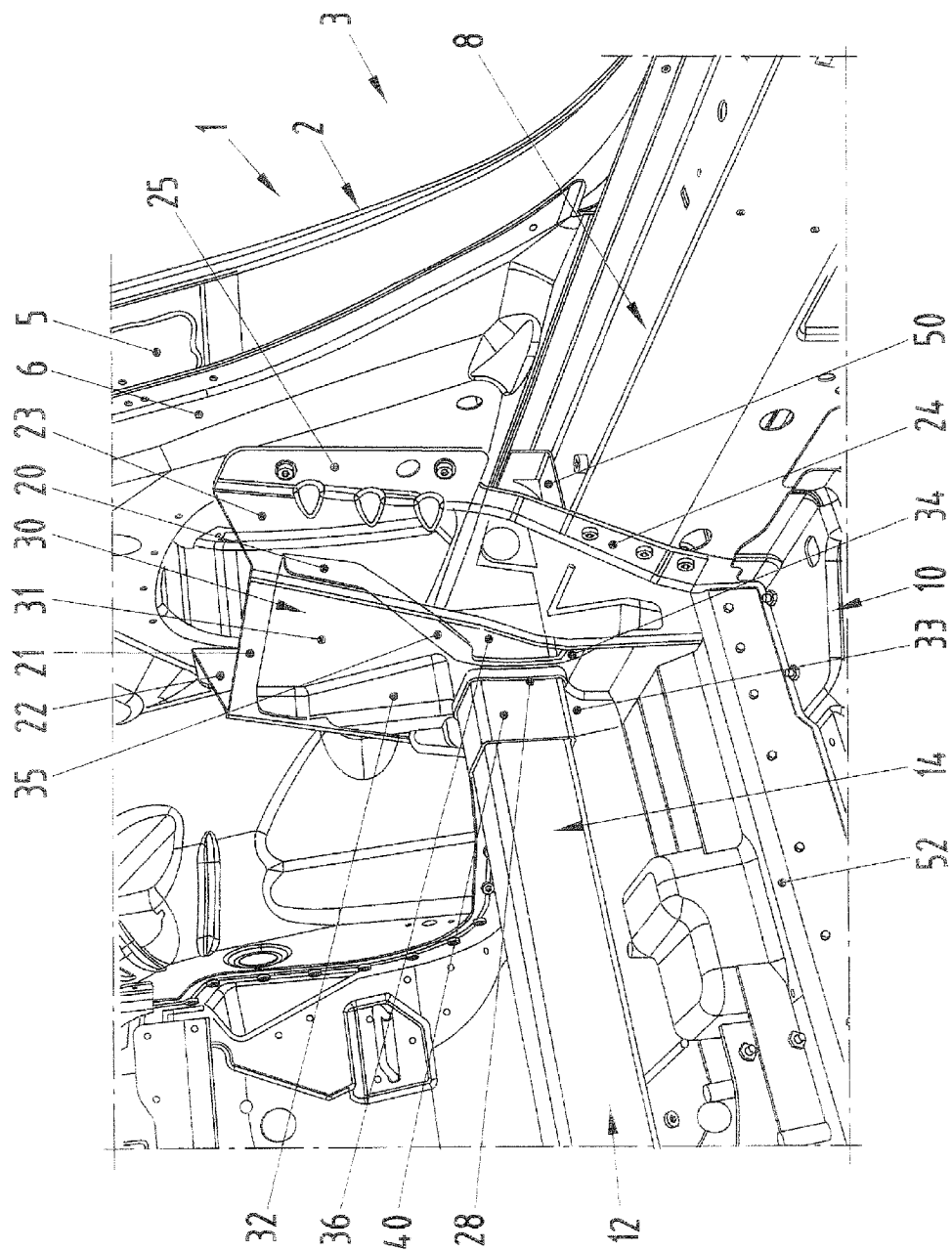
FIG. 1 is a perspective view of a portion of a body of a motor vehicle, looking in the direction of a device according to the invention, a bracket fixed to the vehicle being depicted as transparent to render visible a profile part arranged behind it.
Figure 2:
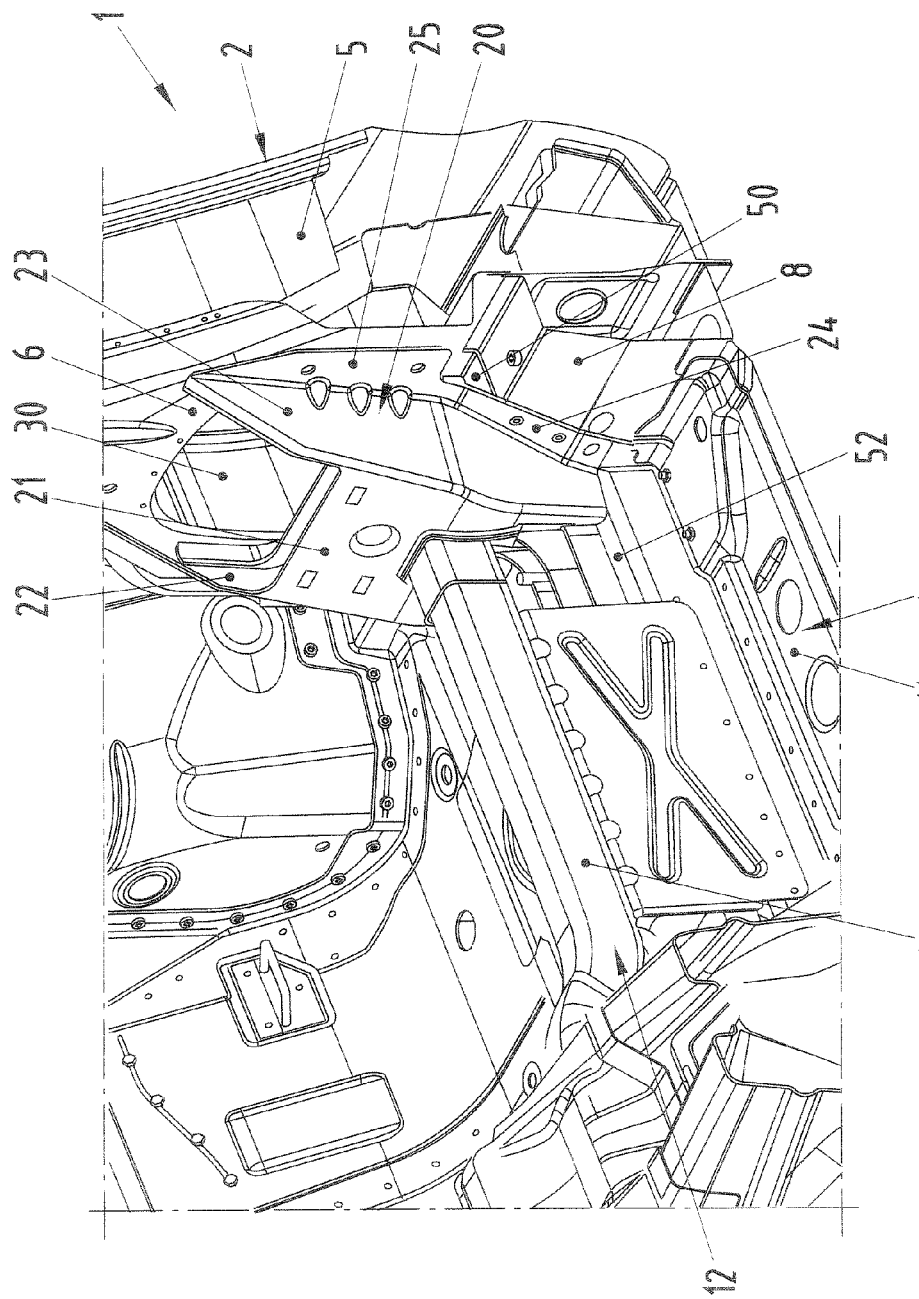
FIG. 2 is a perspective view similar to FIG. 1, but the bracket fixed to the vehicle is not depicted as transparent.
Figure 3:
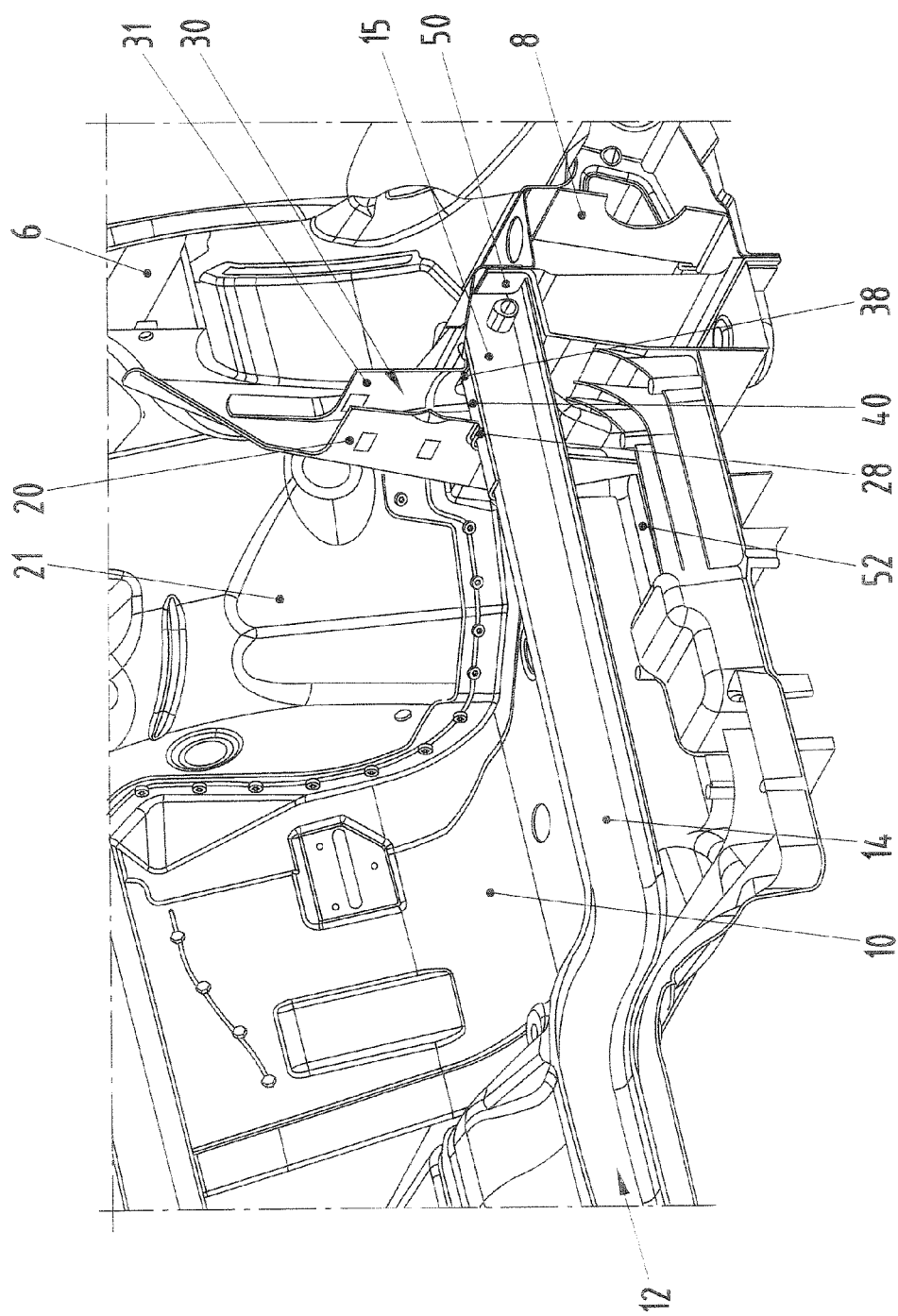
FIG. 3 is a perspective view similar to FIGS. 1 and 2, with the bracket fixed to the vehicle and the profile part arranged behind it being depicted in section.

A device in accordance with the invention is identified generally by the numeral 1 in FIGS. 1 to 3. The device 1 functions to absorb side impact forces applied laterally to a body 2 of a motor vehicle 3 in the event of an accident or crash.

The body 2 comprises a door aperture 5, such as a driver's door aperture or a front passenger door aperture. The door aperture 5 is bounded at the rear, as viewed in the longitudinal direction of the vehicle, by a B pillar 6. The B pillar 6 is rooted in a longitudinal beam 8 that is situated on an outer side. The longitudinal beam 8 also is referred to as a sill and forms the lateral boundary of a floor assembly 10 that includes a floor panel 11.

The device 1 comprises a reinforcing structure 12 with a reinforcing beam 14 of substantially rectangular cross section that extends transverse to the longitudinal direction of the vehicle. The reinforcing beam 14 is cranked or curved in the region of a center tunnel, as shown in FIGS. 2 and 3, but is substantially parallel to the floor assembly 10 and to the floor panel 11 at other locations.

The reinforcing beam 14 also can have a nonrectangular polygonal cross section or a round or elliptical cross section. The illustrated reinforcing beam 14 is of integral or unitary construction, but can be of multi-part design.

The reinforcing structure 12 creates a sufficient survival space for motor vehicle occupants in the event of a side impact with a predetermined force. The reinforcing beam 14 preferably extends between two B-pillar roots. However, the reinforcing beam 14 can extend between the bottom rear corners of door apertures on vehicles that do not have a distinct B pillar.

One end 15 of the reinforcing beam 14 is supported on the longitudinal beam 8 and the B pillar 6 via a bracket 20 that is fixed to the vehicle. The bracket 20 comprises a bottom plate 21 that is arranged substantially transversely to the reinforcing beam 14. Two wings 22, 23 project at a right angle from opposite front and rear sides of the bottom plate 21 and extend from the bottom plate 21 towards the longitudinal beam 8 and the B pillar 6. Fixing flanges 24, 25 project at an angle from the respective wings 22, 23.

The fixing flange 24 of the bracket 20 rests flat against the longitudinal beam 8 and is attached firmly to the longitudinal beam 8 by a joint that preferably is welded and/or riveted. Similarly, the fixing flange 25 rests flat against the B pillar 6 and is attached firmly to the B pillar 6 by a joint that preferably is welded and/or riveted.

The reinforcing beam 14 extends through a hole 28 in the bottom plate 21 of the bracket 20 that has been fixed to the vehicle and continues to a profile part 30 that has a base plate 31 with a dished profile. The base plate 31 is substantially parallel to the bottom plate 21 of the bracket 20 that has been fixed to the vehicle 3.

The base plate 31 of the profile part 30 preferably is formed from sheet metal and defines an X-shaped reinforcing structure with first through fourth legs 32, 33, 34, 35. The profile part 30 has a first connecting web (not shown) that integrally joins the first and second legs 32 and 33 and a second connecting web 36 that integrally joins the third and fourth legs 34, 35. The connecting webs delimit a through hole 38 in the base plate 31 of the profile part 30 for receiving the reinforcing beam 14 and a reinforcing sleeve 40.

The through hole 28 in the bottom plate 21 of the bracket 20 that is fixed to the vehicle 3 aligns with the through hole 38 in the base plate 31 of the profile part 30, as shown in FIG. 3. The reinforcing sleeve 40 surrounds a portion at the end 15 of the reinforcing beam 14, and this assembly of the reinforcing beam 14 and the reinforcing sleeve 40 extend through the aligned through holes 28, 38.

The end 15 of the reinforcing beam 14 is supported on the longitudinal beam 8 by the bracket 20 that is fixed to the vehicle, and also is supported on the longitudinal beam 8 by a second bracket 50. The second bracket 50 is part of a cast reinforcing beam 52 that is formed with ribs that extend in the transverse direction of the vehicle 3.

What is claimed is:

1. A device for absorbing side forces during a side impact of a motor vehicle, the device comprising: a reinforcing structure that includes a transversely extending reinforcing beam with an end arranged in a bracket fixed to the vehicle, a profile part at the end of the reinforcing beam supporting the reinforcing beam, the profile part having a dished profile with a base plate connected firmly on two longitudinal sides to the bracket that is fixed to the vehicle, the profile part further having an X-shaped reinforcing structure with four legs connected together integrally by the base plate.

2. The device of claim 1, wherein the profile part has connecting webs facing the reinforcing beam, each connecting web being connected to two of the legs of the X-shaped reinforcing structure.

3. The device of claim 2, further comprising a reinforcing sleeve, the end of the reinforcing beam passing through the reinforcing sleeve and the connecting webs of the profile part resting against the reinforcing sleeve.

4. A device, for absorbing side forces during a side impact of a motor vehicle, the device comprising: a reinforcing structure that includes a transversely extending reinforcing beam with an end arranged in a bracket fixed to the vehicle, a profile part at the end of the reinforcing beam supporting the reinforcing beam, the profile part being plate connected firmly to the bracket that is fixed to the vehicle, wherein the bracket fixed to the vehicle comprises a bottom plate with a hole, the reinforcing beam extending through the hole, the bottom plate of the bracket being spaced apart from the base plate of the profile part.

5. The device of claim 4, further comprising first and second wings projecting at an angle from opposite sides of the bottom plate of the bracket that is fixed to the vehicle, the base plate of the profile part being fixed to the wings.

6. The device of claim 5, further comprising first and second fixing flanges projecting at an angle from the respective first and second wings, the fixing flanges being fixed respectively to a B pillar and a sill of the motor vehicle.

7. The device of claim 6, further comprising a second bracket supporting the reinforcing beam at a position inside of the sill.

8. The device of claim 7, wherein the second bracket is integral with a floor reinforcement that extends underneath the reinforcing beam.

9. The device of claim 1, wherein the reinforcing beam has a substantially rectangular cross section.

10. The device of claim 1, wherein the reinforcing beam is of unitary construction.

11. A motor vehicle comprising:
    a sill extending substantially in a longitudinal direction of the vehicle;
    a B pillar extending substantially vertically from the sill;
    a bracket having first and second fixing flanges connected respectively to the B pillar and the sill, first and second wings projecting from the fixing flanges toward an interior of the vehicle, and a bottom plate extending between the wings, and a hole being formed through the bottom plate;
    a profile part having a base plate defining a hole aligned with the hole of the bottom plate of the bracket, the base plate being connected firmly to the wings of the bracket; and
    a reinforcing beam with an end passing through the holes in the bottom plate of the bracket and the base plate of the profile part, whereby forces that occur during a side impact are introduced laterally in a controlled manner into the reinforcing beam both by the B pillar and the sill.

12. The motor vehicle of claim 11, wherein the profile part has an X-shaped reinforcing structure with four legs.

13. The motor vehicle of claim 12, wherein the profile part has connecting webs facing the reinforcing beam, each connecting web being connected to two of the legs of the X-shaped reinforcing structure.

14. The motor vehicle of claim 13, further comprising a reinforcing sleeve, the end of the reinforcing beam passing through the reinforcing sleeve and the connecting webs of the profile part resting against the reinforcing sleeve.

15. The motor vehicle of claim 12, wherein the four legs of the X-shaped reinforcing structure of the profile part are connected together integrally by the base plate.

16. The motor vehicle of claim 11, further comprising a second bracket supporting the reinforcing beam at a position inside of the sill.

17. The motor vehicle of claim 16, wherein the second bracket is integral with a floor reinforcement that extends underneath the reinforcing beam.

* * * * *